Dec. 16, 1930. F. R. LONGSTREET 1,784,939
AEROPLANE
Filed Aug. 24, 1929
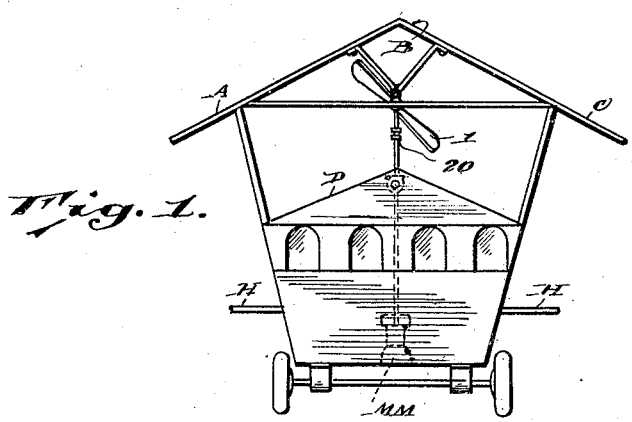
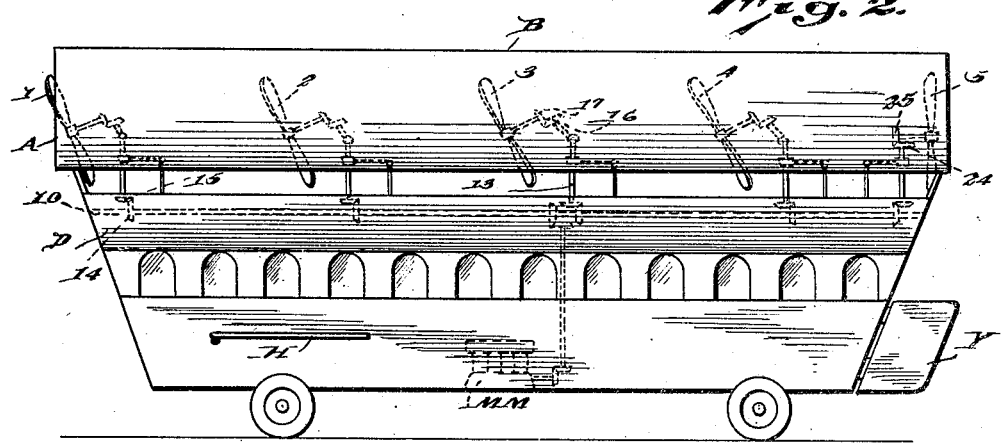
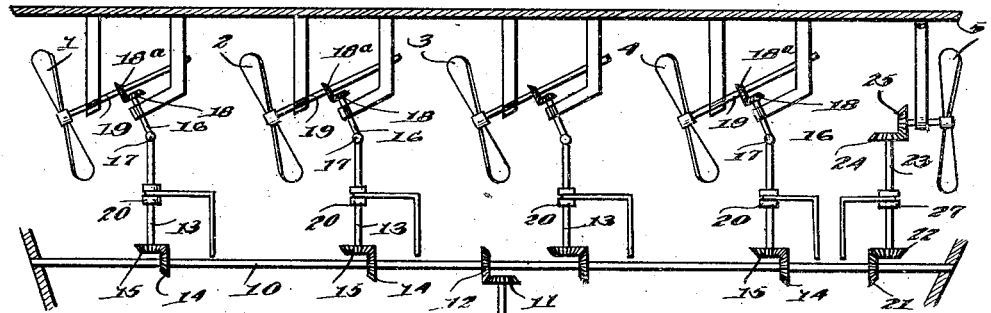
Fitz Randolph Longstreet
INVENTOR Patented Dec. 16, 1930

1,784,939

UNITED STATES PATENT OFFICE

FITZ RANDOLPH LONGSTREET, OF GAINESVILLE, GEORGIA

AEROPLANE

Application filed August 24, 1929. Serial No. 388,236.

My invention consists in combining the principle of the parachute with those of the aeroplane, and the peculiar position of the propellers thereof.

In the drawings, in which like reference numerals refer to like parts throughout the same, Figure 1 is an end view looking at the front of my airship;

Fig. 2 is a side elevation showing some parts in dotted lines, and

Fig. 3 is a side view of a preferred form of driving arrangement for the propellers.

I construct my airship in a somewhat rectangular shape, covering the framework with rigid planes, said planes being in the shape of a long rather low roof, extending a little longer than the body of car below, the planes being joined together lengthwise on their inner edges at an angle at the ridge, and left open at ends and sides for passage of the air currents.

The supports extending from the planes to body of car then should be inclined inwards all around as shown in drawings, Figs. 1 and 2, thus utilizing the principles of the parachute with a great sustaining force, and at the same time a large equilibrium.

Referring to accompanying drawings Fig. 1 shows front and rear views of my airship, A, B, C, being the roof planes, B the ridge or top, D, D a second and smaller roof plane could be used to protect car below from air currents of the propellers or to deflect said currents at an angle, also giving a greater sustaining power. Reference is here made to my application Serial Number 284,635 filed June 11th 1928. By using the ridge roof construction as shown for the planes, at A, B, C in Fig. 1, and A, B, A in Fig. 2, would give more steadiness and directness in flight, like the keel of a ship, also would present less resistance to the air.

For proportion I use a series of propellers, placed directly under and near the ridge of the roof planes, just near enough so that the lifting forces of the propeller's air currents will be effective against the under sides of the planes, said propellers, extending under the ridge at intervals about the length of the roof planes as shown at 1, 2, 3, 4 and 5 in Fig. 2, all the propellers except the rear one are turned slightly upwards to the rear, so as to throw their currents towards the roof planes and to the rear, thus assisting in making a quicker ascent and to lessen the downward pressure of air currents on body of the car below. The rear propeller should be vertical as shown so as to be used for forward propulsion though any and all will be effective when once in flight. Each propeller should be made independent of each other, so they can be used separately, in couples, or all together, but as all of them will not be needed in flight, some can be reserved for accidents. This can be done by having all the propellers driven from a central shaft, and each mounted so it can be connected or disconnected with said shaft, by shift gears or clutches, when so desired. The central shaft connecting with the motors M, M, by shafts with geared connections, or in any other suitable manner.

The preferred gearing arrangement for accomplishing the above result includes a bevel gear 6 mounted on the crank shaft 7 of the motors M, M. This bevel gear 6 is in mesh with a bevel gear 8 mounted on a vertical shaft 9 which in turn drives a central horizontal shaft 10 through the medium of bevel gears 11 and 12 mounted on the respective shafts. For driving the four inclined propellers I provide four vertical shafts 13 which are driven from the central shaft 10, by means of bevel gears 14 and 15, mounted on the shafts 10 and 13 respectively. Each shaft 13 connects at its upper end with a forwardly inclined shaft 16 through the medium of a universal joint 17. The shafts 16 in turn are provided with bevel gears 18 on their upper ends for driving the downwardly inclined propeller shafts 19 through the medium of the bevel gears 18a carried by said shafts. In order that the respective propellers may be disengaged at will, I prefer to have the shafts 13 formed of two sections so that a suitable clutch 20 may be inserted between the sections. These clutches may be provided with any suitable operating means whereby the driving and driven sections of shaft 13 may be disconnected and the respective propellers thrown in or out of driving connection with the motor. The vertical rear propeller 5 is also driven from the central shaft 10 by means of bevel gears 21 and 22, vertical shaft 23, and bevel gears 24 and 25. The shaft 23 for this propeller may also be provided with a clutch 27 in the same manner as shafts 13 if so desired.

The motors and gasoline tanks should be near the center and bottom of car body, to give greater equilibrium to the whole structure.

By this combination of planes and propellers, the swift currents of air are immediately thrown under and against the whole length of the roof planes, giving a powerful lifting force by compressing the air in trough made by the angle in the top, the length of the roof planes giving a powerful lifting as well as pushing force, for the outside air would rush in along the sides as well as ends till in swift flight, when the propeller's forces would be mostly for propulsion.

A rudder at G could be used, also ailerons to assist in rising and descending can be attached as at H, H, the whole structure to be on wheels to aid in getting off and on the ground.

The advantages in making this type of airship, with the planes like a long, rather low ridge, roof firmly attached all around to frame of structure, would be greater safety, greater steadiness, and greater sustaining power, and in ascending the ridge formation would cleave the atmosphere better than rounded planes, and in descending would act equally as a parachute, also this type of straight rigid roof planes could be made stronger than others and being straight give freer passage to air currents when in flight and accordingly swifter travel. Also the propellers being close up to the planes all along, the powerful upward drafts would cause the airship to take off more quickly and evenly, and descend more slowly. Also by having a series of independent propellers so placed or inclined, counter currents could be created under the planes to assist in descending slowly, or acting all together to arise quickly, but in flight only one or two would be necessary while the others are held in reserve for accidents.

Therefore I claim:

1. An airship, using a series of propellers placed directly under the top of rounded or angular roof planes, and extending at intervals parallel with said ridge almost the length of roof planes, said propellers being turned slightly upwards towards the rear, except rear propeller which is made vertical, as set forth.

2. An airship using the combination of long ridge roof planes as set forth with a series of propellers, placed directly under and near the ridge of said roof planes and extending at intervals parallel with said ridge almost the length of the roof planes, said propellers being slightly inclined upward to the rear, while the rear propeller is made vertical, as set forth.

FITZ RANDOLPH LONGSTREET.